United States Patent
Quintrell

(10) Patent No.: US 10,530,428 B2
(45) Date of Patent: Jan. 7, 2020

(54) COAL TRACKER

(71) Applicant: JRL Coal, Inc., Milton, GA (US)

(72) Inventor: William Quintrell, Milton, GA (US)

(73) Assignee: JRL Coal, Inc., Milton, GA (US)

( * ) Notice: Subject to any disclaimer, the term of this patent is extended or adjusted under 35 U.S.C. 154(b) by 0 days.

(21) Appl. No.: 15/836,063

(22) Filed: Dec. 8, 2017

(65) Prior Publication Data
US 2019/0181917 A1    Jun. 13, 2019

(51) Int. Cl.
| H04B 7/00 | (2006.01) |
| H04B 5/00 | (2006.01) |
| G07C 5/00 | (2006.01) |
| G06Q 50/28 | (2012.01) |
| G06Q 50/30 | (2012.01) |
| H04W 4/80 | (2018.01) |
| H04W 4/04 | (2009.01) |
| E21F 13/06 | (2006.01) |
| G01S 19/01 | (2010.01) |
| G01S 5/02 | (2010.01) |

(52) U.S. Cl.
CPC .......... *H04B 5/0062* (2013.01); *G06Q 50/28* (2013.01); *G06Q 50/30* (2013.01); *G07C 5/008* (2013.01); *H04W 4/80* (2018.02); *E21F 13/06* (2013.01); *G01S 5/0294* (2013.01); *G01S 19/01* (2013.01); *H04W 4/046* (2013.01)

(58) Field of Classification Search
CPC ....... H04B 5/0062; H04W 4/80; G06Q 50/28; G06Q 50/30; G07C 5/008
See application file for complete search history.

(56) References Cited

U.S. PATENT DOCUMENTS

| 6,669,089 B2 | 12/2003 | Cybulski et al. |
| 6,693,511 B1 | 2/2004 | Seal |
| 7,053,777 B2 | 5/2006 | Allen |
| 7,102,510 B2 | 9/2006 | Boling et al. |
| 7,518,511 B1 | 4/2009 | Panja et al. |
| 7,739,147 B2 | 6/2010 | Branigan et al. |
| 7,990,272 B2 | 8/2011 | Wass et al. |
| 8,294,568 B2 | 10/2012 | Barret |
| 8,533,125 B2 | 9/2013 | Cherneff |
| 2003/0057083 A1* | 3/2003 | Eatough .................. C10B 53/08 201/21 |
| 2008/0011839 A1* | 1/2008 | Noll ........................ G06Q 10/08 235/384 |
| 2008/0042842 A1* | 2/2008 | Ulibarri ................. G06Q 10/08 340/572.1 |
| 2009/0266891 A1* | 10/2009 | Santucci ............ G06Q 10/0875 235/385 |

(Continued)

FOREIGN PATENT DOCUMENTS

| CN | 103778505 | 5/2014 |
| CN | 203930932 | 11/2014 |

(Continued)

*Primary Examiner* — Md K Talukder
(74) *Attorney, Agent, or Firm* — David L. King

(57) ABSTRACT

A system to process and handle minerals, aggregates, or ore during mining operations in a way that automatically collects, carries and transmits data about the product being mined. When mining coal, the system has a loader with a tag writer and coal loadable trucks with beds having read and writeable electronic tags mounted externally.

4 Claims, 10 Drawing Sheets

(56) References Cited

U.S. PATENT DOCUMENTS

| | | | | |
|---|---|---|---|---|
| 2010/0206642 | A1* | 8/2010 | Curotto | G06Q 10/30 177/1 |
| 2011/0068954 | A1* | 3/2011 | McQuade | G08G 1/20 340/988 |
| 2011/0247233 | A1* | 10/2011 | Bland | C10B 57/10 34/333 |
| 2011/0309935 | A1* | 12/2011 | Emmett | G06Q 10/06 340/572.1 |
| 2013/0194079 | A1* | 8/2013 | Ahler | E21F 17/18 340/10.42 |
| 2013/0304614 | A1* | 11/2013 | Christie | G06Q 10/0875 705/29 |
| 2015/0097412 | A1* | 4/2015 | Smith | E21C 41/16 299/1.05 |
| 2015/0203930 | A1* | 7/2015 | Nakagawa | C21B 5/003 75/330 |
| 2016/0240018 | A1* | 8/2016 | Shayovitch | G07C 5/008 |
| 2017/0186124 | A1* | 6/2017 | Jones | G06Q 10/06311 |
| 2018/0174377 | A1* | 6/2018 | Collins | E02F 9/2054 |
| 2018/0179737 | A1* | 6/2018 | Friend | E02F 3/842 |
| 2019/0033808 | A1* | 1/2019 | Mountford | G05B 19/042 |
| 2019/0181917 | A1* | 6/2019 | Quintrell | G06Q 50/30 |

FOREIGN PATENT DOCUMENTS

| | | |
|---|---|---|
| CN | 204029156 | 12/2014 |
| CN | 204791172 | 11/2015 |
| CN | 106127600 | 11/2016 |
| CN | 106529885 | 3/2017 |
| GB | 2515875 | 1/2015 |
| WO | 2010020359 | 2/2010 |

* cited by examiner

Antenna coverage

Truck backed into bay

COAL TRACKER

FIELD OF THE INVENTION

The present invention relates to a mineral and aggregate mining extraction, processing and distribution system generally and more particularly to a system and process for coal mining configured to automatically gather and transmit data about each specific truckload of material being mined.

BACKGROUND OF THE INVENTION

Mining generally requires a large capital investment in equipment and machinery. To best utilize the manpower and equipment in mining operations requires mine operators to be extremely efficient.

In the area of mining generally there are various types of mining. Below surface mining requires the construction of deep shafts and underground chambers to position equipment near the minerals being mined. Coal for example lies in seams running for miles, each seam can be many feet thick and span large areas. Precious metals like gold and silver are said to run in veins and are typically harder to mine resulting in much higher costs as large amounts of ore must be processed to recover small amounts of the precious metals.

With coal, the raw material is abundant and comparatively easier to mine resulting in lower value. Coal's primary end use is as an energy producing combustion material and therefore coal competes with natural gas, solar, wind, nuclear energy and hydroelectrical power systems.

Historically, coal is one of the cheapest fuel for producing electricity. Environmental concerns have raised speculation that this abundant source of energy may eventually have to be regulated to reduce the amount of coal mined in order reduce environmental impact. This is particularly true as power generating electric companies using coal convert to natural gas. To offset this reduction, the coal producing industry needs to become more efficient in their operations and in their effort to provide a reliable product that not only can compete on a cost basis, but also on a quality of product being sold.

Among those coal product related issues are reducing the level of heavy metals such as arsenic, lead, mercury and lowering the sulfur content while providing a reliable cleaner burning coal.

The present invention assists in these regards by providing a state of the art mining system that provides real time product data along every step of the mining operation. The system and processes described as follows provides a unique way to track the product, whether the product is minerals, aggregates or ores including coal, from the time it its extracted from the ground to the loading on rail cars and shipment to its final destination.

SUMMARY OF THE INVENTION

A system to process and handle minerals, aggregates, or ore during mining operations in a way that automatically transmits data about the product being mined. When mining coal, the system has a loader or loading device or machine with a tag writer and coal loadable trucks with beds having read and writeable electronic tags mounted externally. The beds for receiving coal and the tags are writable from a distance remotely. The tag writer from the loader inputs data onto the tags mounted externally on the bed of the truck. The data includes the GPS (Global Positioning System) location of the coal being dumped into the bed of the truck, the date or time of the loading of the bed, method of extraction, loader identification and the truck identification.

The system also optionally can include at least one weighing scale or truck weighing scale with a tag reader to receive data inputted onto the tags. The weight and the tag data are transmitted to a central data processing center. The system also can include a conveyor system with a analyzer and a conveyor diverter. The at least one weighing scale can e incorporated into the analyzer or the conveyor system with the analyzer. The conveyor system is for transferring a load of coal to one of a storage site, a cleaning washing site or a coal loading and transporting site. The analyzer is coupled to a loading end of the conveyor system. The analyzer determines the weight and coal quality in terms of the coal to ash ratio, a contaminant assessment to determine levels of unacceptable materials. The conveyor diverter diverts the stream of conveyed coal as it is moved selectively based on the coal quality through conveyors. The conveyors are divided based on the ratio of coal to ash onto storage sites or on through a contaminated coal conveyor to be discarded or to a wash conveyor to reduce ash content. The coal analyzer has a data transmitter to send a computation of the coal load properties to the central data processing center.

The central data processing center has a computer having a database identifying each mine with GPS locations and wherein each mine location is further identified by the mineral rights holder, the fees or royalties applicable per ton based on quality and mine extraction type and wherein upon inputted data taken from the tags and from the analyzer, the computer has a program to automatically determine mineral rights holder price owed, the value of the coal mined. The computer program can automatically produce bills of lading, invoices upon data receipt from said transponders and the analyzer.

A combination of coal transport vehicles has a loader or loading device or machine with a tag writer and a coal loadable truck. The truck has a vehicle chassis and drive train and a bed for receiving and hauling coal and a plurality of read/writable electronic tags mounted externally on the bed of the truck. Each tag is readable and writable from a distance remotely. The plurality of tags being mounted in a defined pattern about the bed, wherein the defined pattern forms an array along each left and right side of the bed and a rear end of the bed. The rear of the bed has at least one tag. Each left side and each right side have two or more tags. The coal loader with a tag writer can be a bucket loader, a lift conveyor, shovel loader or any other loader. The tag writer is mounted externally on a forward side of the loader. The read/writable tags on the bed are battery powered allowing the tag writer to input data to the read/writable tags from a distance of several feet.

A method of mining coal has the steps of inputting the GPS location of the coal into an electronic tag writer mounted onto a loader; inputting the data onto the tag writer; mining the coal using a loader with the tag writer; loading the coal into a truck by approaching a bed of the truck with a plurality of read/writable electronic tags wherein one or more of the tags receives the data from the loader when the loader approaches the bed of the truck to load the truck; optionally driving the truck to a weighing scale where the weight information is added to the tag; the truck continues to where it is dumped and conveyed to the analyzer which adds weight and elemental analysis to the load information. This accumulated dump information is used to control the diverter and is transmitted to the central data center.

The method further has the steps of analyzing the dumped coal by loading the coal onto a conveyor system that passes by a material analyzer, the material analyzer measures the weight and the coal to ash ratio and the amount of or presence of contaminants such as arsenic sulfur content and passes analyzer data to the central computer to establish the coal quality; and segregating the coal by using a plurality of diverters to direct the coal to a dump site based on the analyzed coal properties. The method further has the step of inputting all the collected tag data weigh, dated and analyzed data to a computer program to make a record of each load, establishing the value per load, the fee owed per load automatically.

BRIEF DESCRIPTION OF THE DRAWINGS

The patent or application file contains at least one drawing/photograph executed in color. Copies of this patent or patent application publication with color drawing(s) will be provided by the Office upon request and payment of the necessary fee.

The invention will be described by way of example and with reference to the accompanying drawings in which.

DETAILED DESCRIPTION OF THE INVENTION

Figure 1:
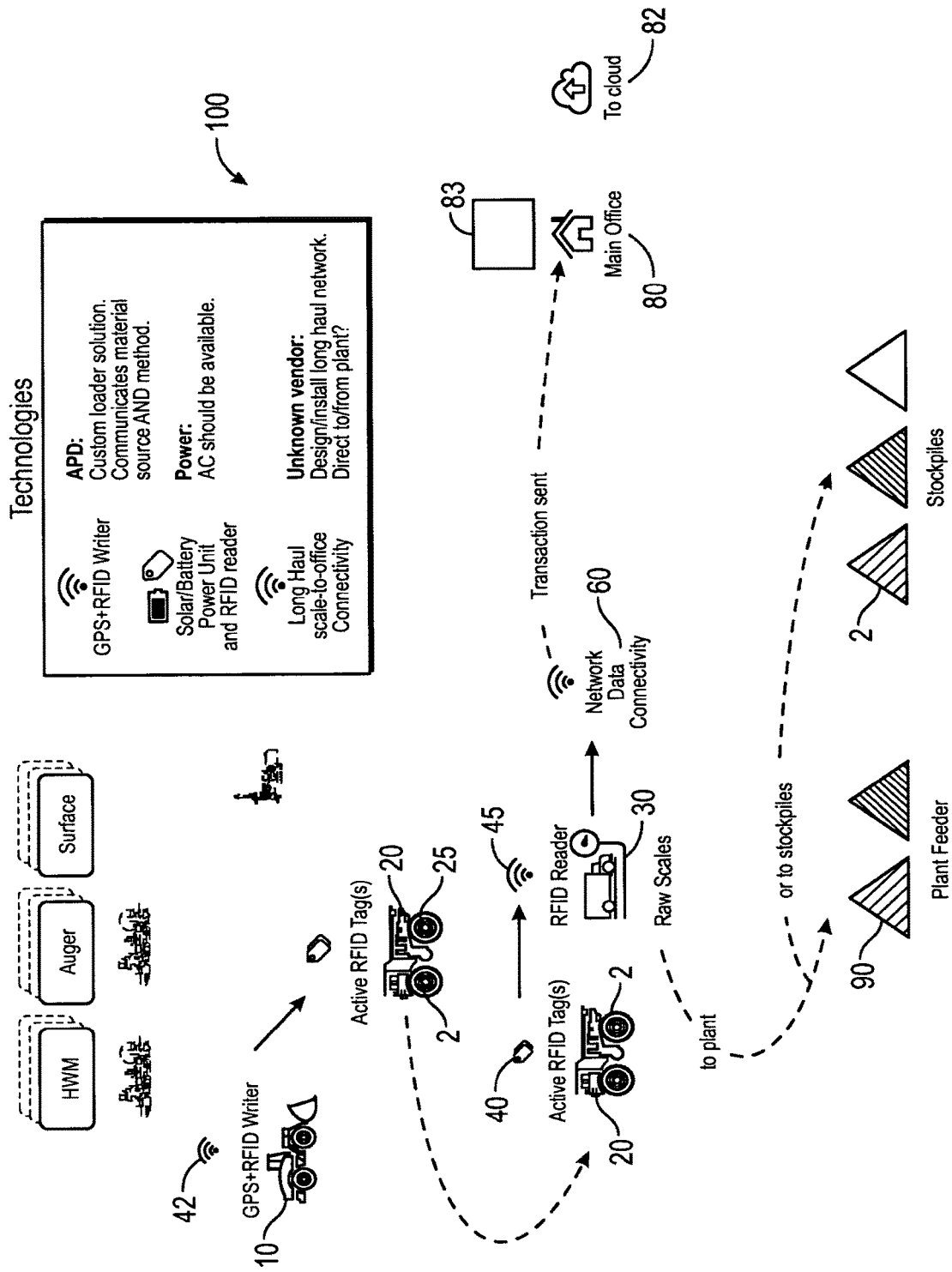
FIG. 1 is a schematic flow chart of data flow for surface mining utilizing the present invention.

With reference to FIG. 1, a schematic view of the data flow for surface mining of coal 2 is illustrated. In the illustrated diagram, in the upper left-hand corner are shown tabs, the left being high wall mining, the middle being auger mining and the one on the right being surface mining. High wall mining involves cutting an L shaped structure onto the side of a mountain and removing seams of coal 2 from the vertical wall. Auger mining is quite similar in that an L shape is also provided and the wall is penetrated with augers that extract the coal 2 and place it on a conveyor system 70 that transports it into waiting trucks 20. Surface mining involves clearing the top surface of the ground of debris and soil until a seam layer of coal 2 is found. At that point, the coal 2 is extracted using front end or bucket loaders 10.

With regard to the present invention, a system 100 is provided wherein the front end bucket loader 10 is equipped with a GPS RFID writer 42, this writer 42 is inputted with the GPS location of the coal and the vehicle identification of the loader 10, this information can then be input into a coal receiving truck 20. The coal receiving truck 20 has a bed 25 with externally mounted RFID tags 40 to receive data from the coal loader 10. The RFID tags 40 are mounted externally on the bed 25 of the truck 20. As the loader 10 approaches the truck 20, the writer 42 transmits information to the tags 40 and inputs that information. That information includes the method of extraction and the coal location by GPS coordinates which is quite helpful because each GPS location can be used to identify the exact location of the material being mined. This is helpful because mineral rights holders called fee owners, need to know how much material is being extracted from their land.

As the loader 10 loads the truck 20 it will be filled with coal 2. Once filled, if truck weight scales are being used, it will be moved to weight scales 30. As shown in the diagram, the loaded truck 20 is backed onto a scale 30, the scale 30 then weighs the truck 20 and the RFID reader 45 takes the information from the tag 40 and transmits the data through a network data system that has network connectivity 60 to a main office 80. The main office has a central data processing center computer 83 that receives the inputted data and stores it locally or to the cloud 82.

Once the truck 20 has been weighed, it is then taken to either a plant where the coal 2 can be cleaned or it can be driven directly to a stock pile. Once dumped, the truck 20 is then reweighed and the net weight of the coal 2 that has been offloaded can be established.

Figure 2:
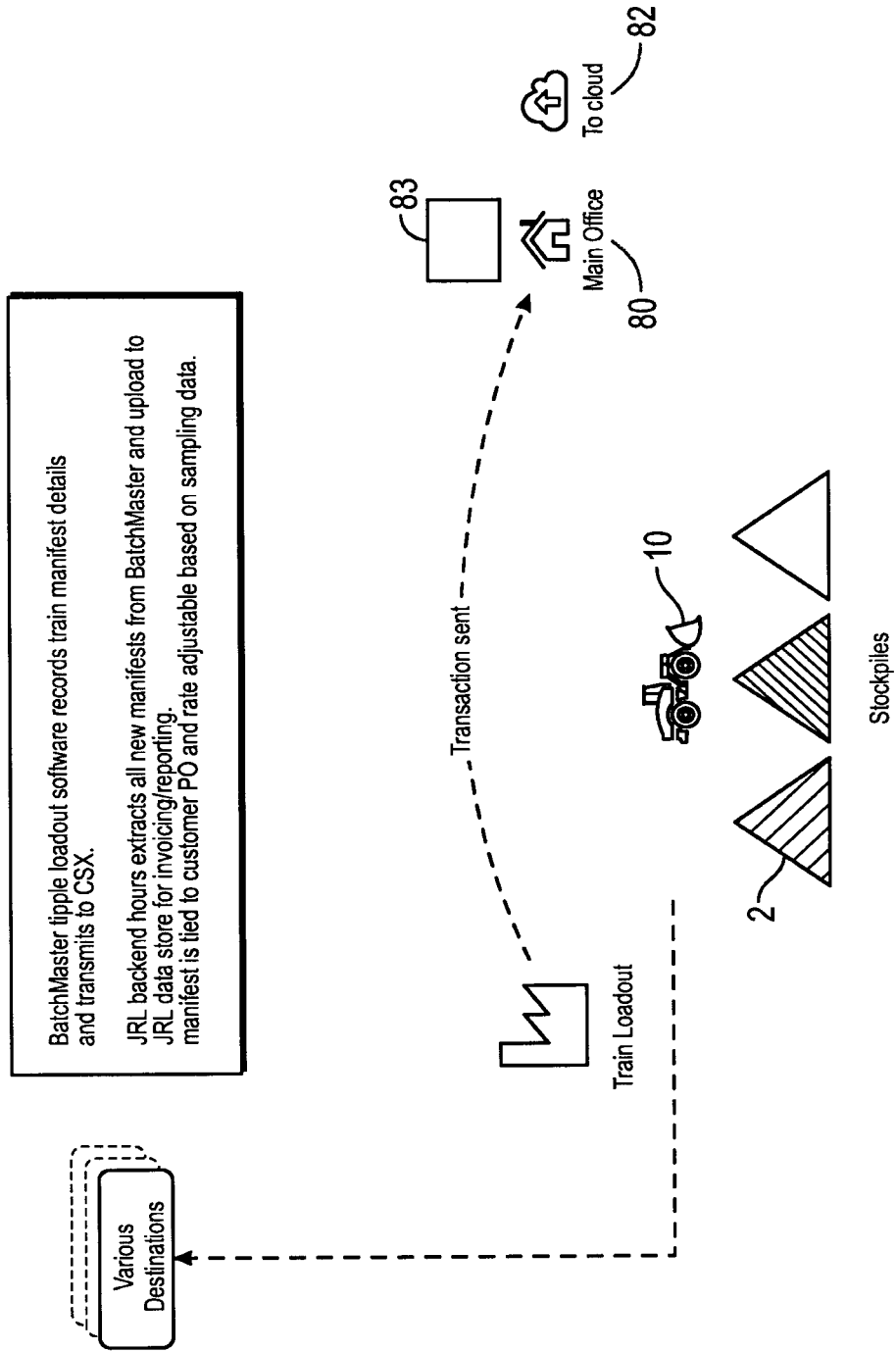
FIG. 2 is a schematic flow chart of data flow for outbound coal by rail utilizing the system of the present invention.

With reference to FIG. 2, once the coal 2 is put into stockpiles, it can be loaded onto trains. The trains can have a connection to the main office and transaction information can be processed using the network to send information from the train loadout station to the main office. Once this is done and the train is loaded, it will move to its various destinations. Typically, a coal train has 110 coal carrying cars.

Figure 3:
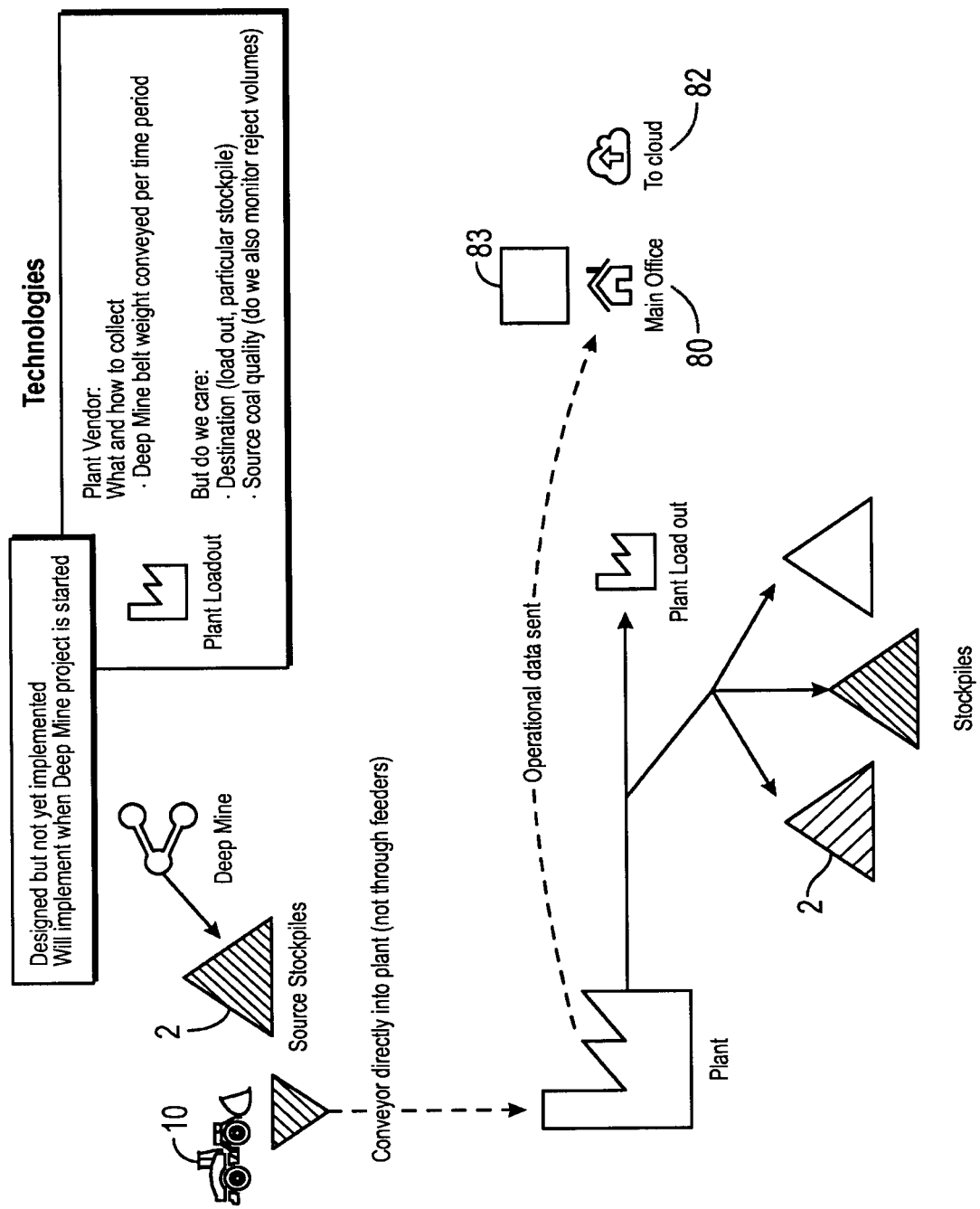
FIG. 3 is a schematic flow chart of data flow for deep mining utilizing the system of the present invention.

With reference to FIG. 3, the data flow can also be used in deep mine operations. In such a case, shafts are drilled into the earth and the coal 2 is dug out from below ground and delivered to the surface in such a fashion that it can be sent on conveyors to a plant to be processed. Once it is delivered to the plant, it can be piled in stockpiles and the data transmitted can be sent to the network similar to what was used in surface mining.

Figure 4:
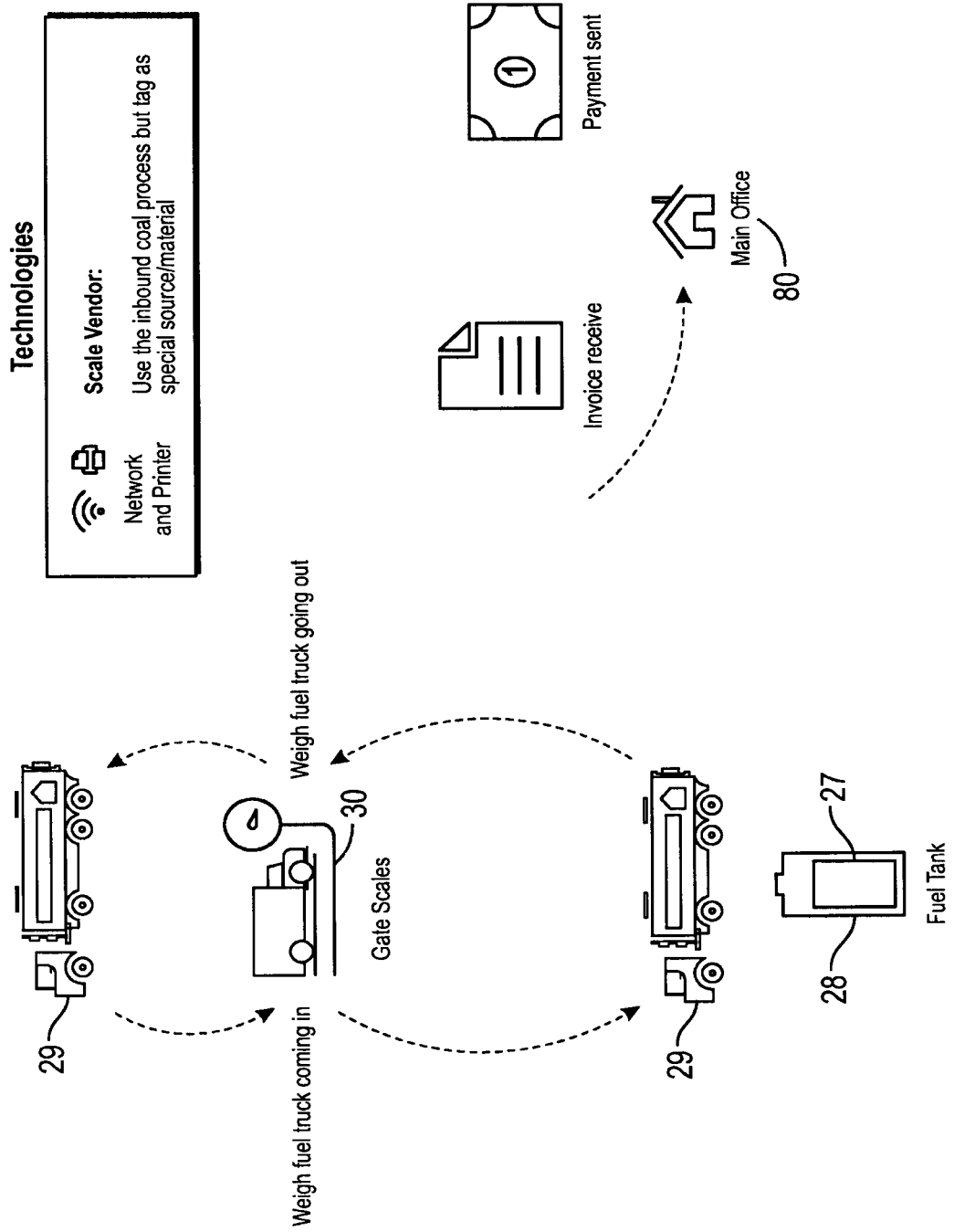
FIG. 4 is a schematic flow chart of data flow for measuring fuel deliveries utilizing a version of the present invention.

Optionally, in FIG. 4 another way of utilizing the system 100 has fuel trucks 29 loaded with RFID tags 40 such that when the trucks 20 come to the mine they can go on the scales 30 to be weighed prior to dumping their fuel 27 into the fuel storage tanks 28. Once the fuel 27 is dumped, the trucks 29 with RFID tags 40 can return to the scales 30 to be reweighed. At that point, the precise amount of fuel 27 delivered can be established. All this information is then taken from the RFID tags 40 and transmitted back to the main office 80 via the network.

Figure 5:
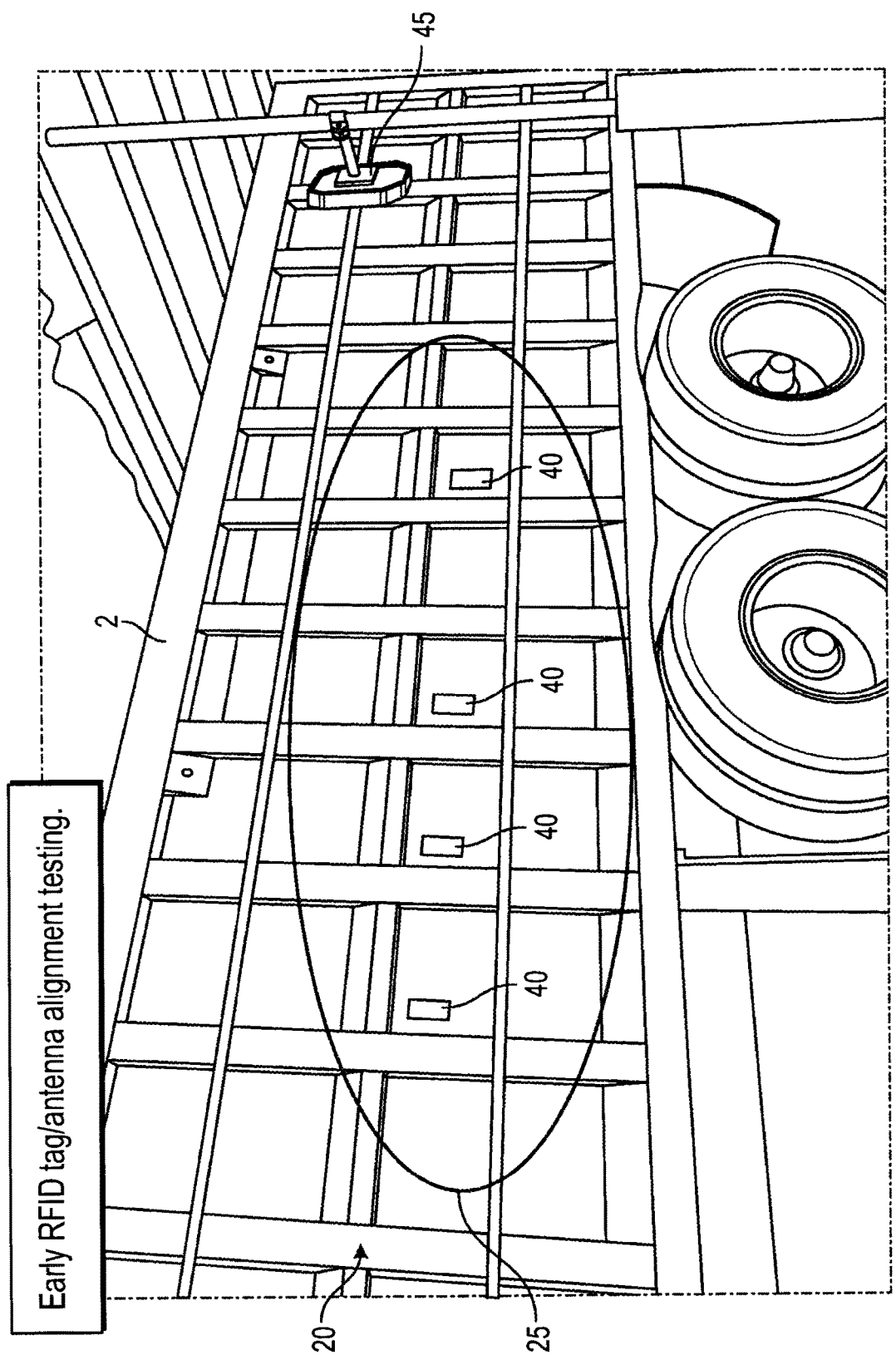
FIG. 5 is a photograph of a dump truck with externally mounted tags and a reader.
Figure 5B:
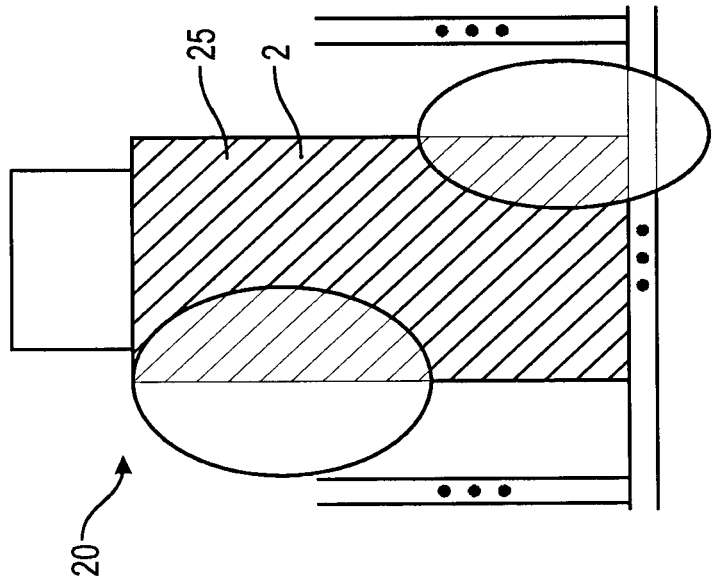
FIG. 5B shows a schematic view of the truck with externally mounted tags on each side of the bed, but offset.
Figure 6:
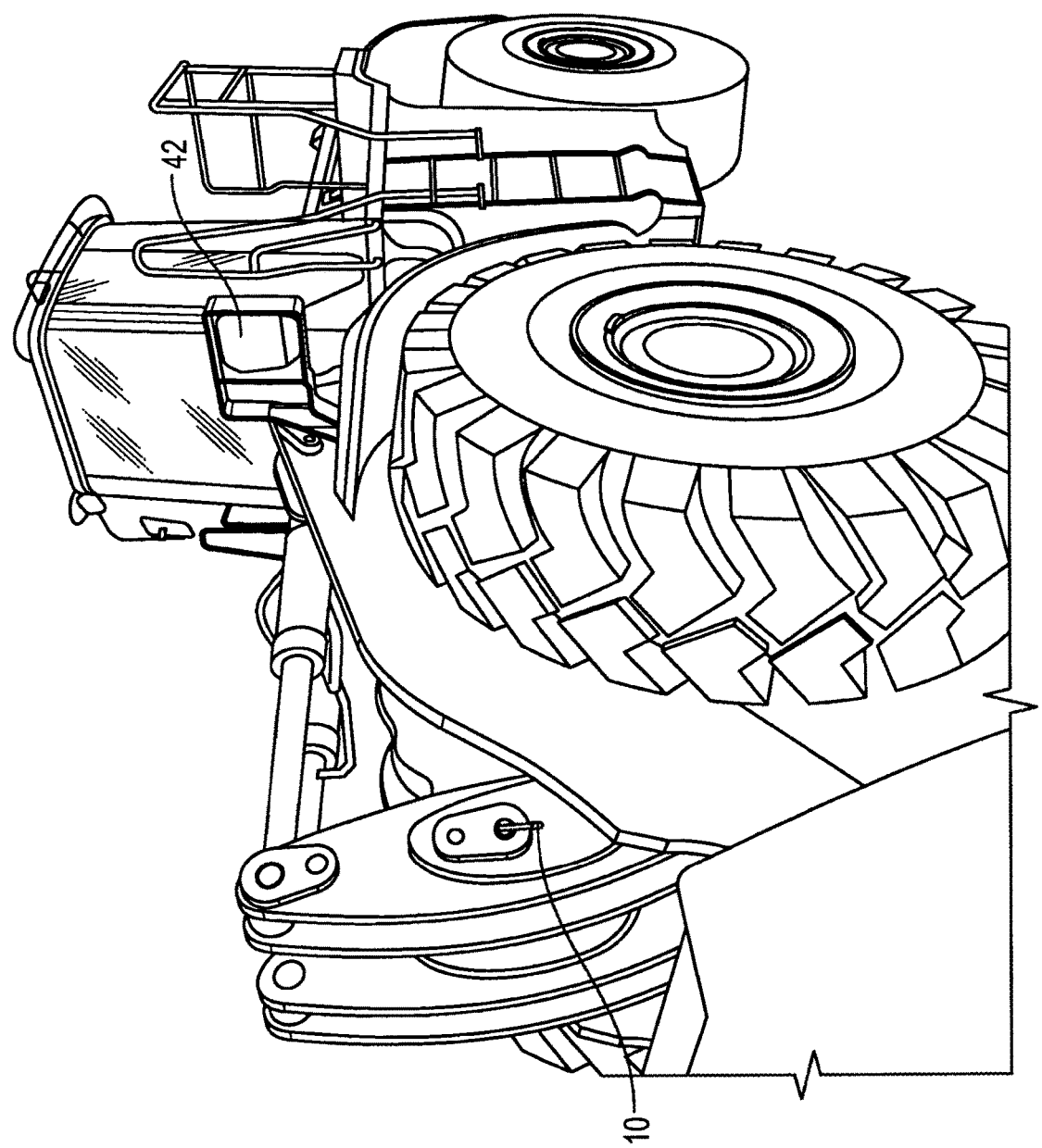
FIG. 6 is a view of a loader with a tag writable transponder for inputting data.

With reference to FIG. 5, a truck 20 is shown with a bed 25. On the bed in FIG. 5 are four tags 40, these tags 40 are mounted externally as shown in the photo there is a tag reader 45 on each side of the truck. As illustrated, the tag reader 45 can be positioned several feet from the truck 20 and pick up signals from the tags 40. The tags 40 are unique in that they are battery assisted and can transmit data over several feet. This is important in that most RFID tags require very close proximity to the reader to be able to transmit data. In the present invention, a very rugged system has been developed wherein the tag can transmit over an extended distance of several feet, but not so far as to trigger false readings. This is important in that when the trucks 20 are at the mining location, the loaders 10 will move in close proximity, mostly centered on the side of the truck 20, when it is a bucket loader 10, such that the load can be centrally dumped in the truck to fill the bed 25 of the truck 20. In order to make this happen, as shown in FIG. 6, the loader 10 has the RFID writer 42 positioned offset from the front of the truck 20. This means it can be on the left or right side of the loader 10. When the loader 10 approaches the truck 20 from a side, the tags need to be shifted to the forward side, as shown in FIG. 5B, or to the rear side, as further shown in FIG. 5B, depending on which side the loader 10 needs to approach the truck 20.

Figure 5A:
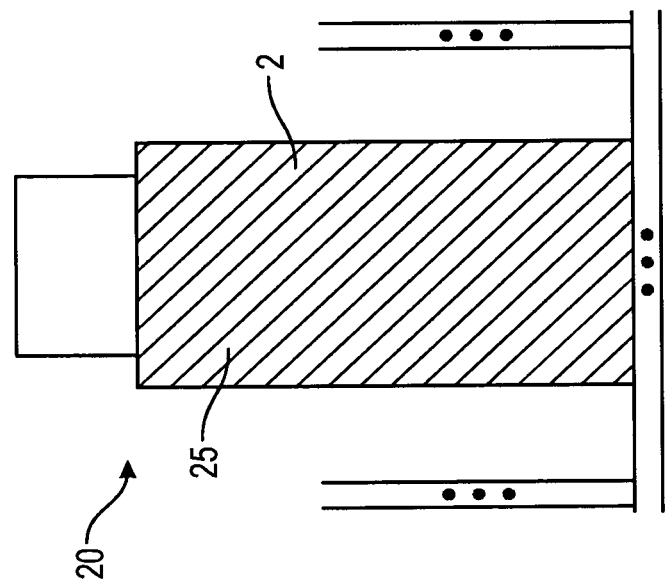
FIG. 5A is an example of a typical truck in a bay.

FIG. 5A shows a conventional truck 20 backed into a bay without any tags. Additionally, where a shovel is used, the rear end of the truck 20 would have at least one tag 40 so that when the shovel when approaching the rear of the truck 20 can have data written as well.

Figure 7:
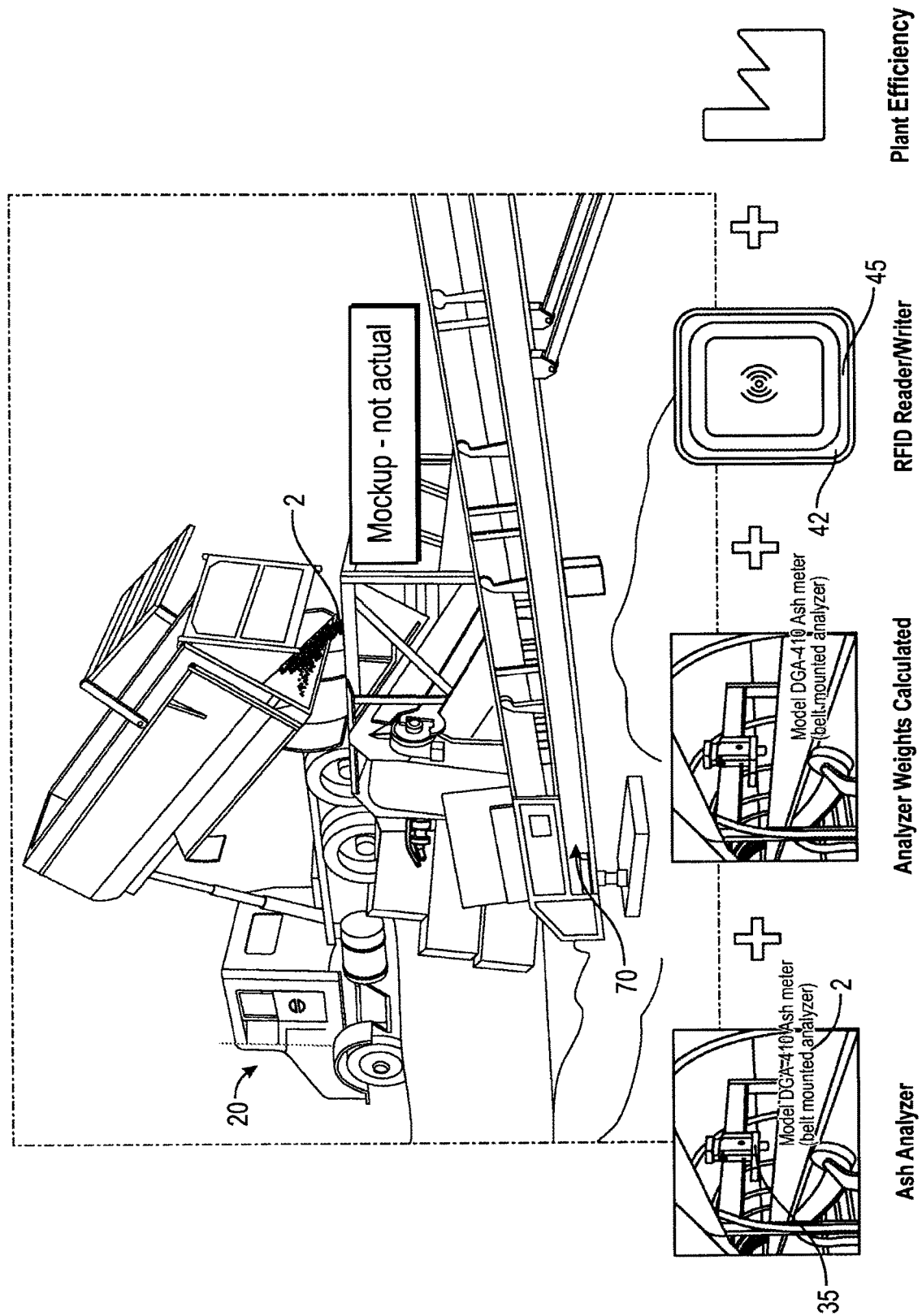
FIG. 7 is an exemplary view of a material analyzer and conveyor system.

With reference to FIG. 7, a feature added to the overall system 100 is a material analyzer 35. In this system, a truck 20 will dump its load onto a conveyor bin. In the conveyor bin, the bin above the conveyor 70 will then drop the material onto a conveyor 70 which than passes under a material analyzer 35. In the illustrated embodiment of FIG. 7, the analyzer 35 is an ash analyzer and the ash analyzer can calculate the amount of ash that is in the coal 2 being dumped. Coal 2 is a burnable material. Ash is considered any material in the mining operation that is not burnable. Electric companies using coal to power their generators have a certain percentage of ash intermixed with the coal. This is a fairly low percentage, but it needs to be uniform in order to precisely control the burn rate and to keep the temperatures of the material fueling the generators relatively constant as it burns. In the present invention, the coal analyzer 35 is able to transmit back to the network 60 such that the data with regard to the coal quality and weight can be established. In other words, the amount of ash in the material can be established with will then also affect the price of the material being sold and the royalties being paid for the coal being received. In addition, an elemental analyzer 35 can measure the amount of sulfur in the coal 2 and also any heavy metals such as arsenic or lead. These heavy metals if in a high enough concentration may make the material unusable. As such the analyzer 35 provides an efficient way of establishing the quality of the coal and whether or not it is suitable for its intended use.

Figure 8B:
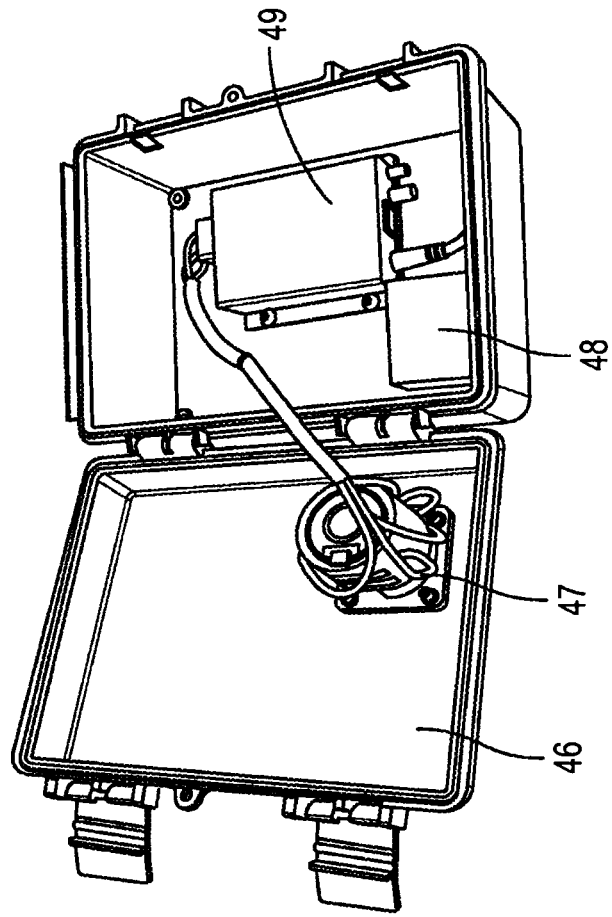
FIG. 8B is a photograph of an open control box that includes the RFID read/writer.
Figure 8A:
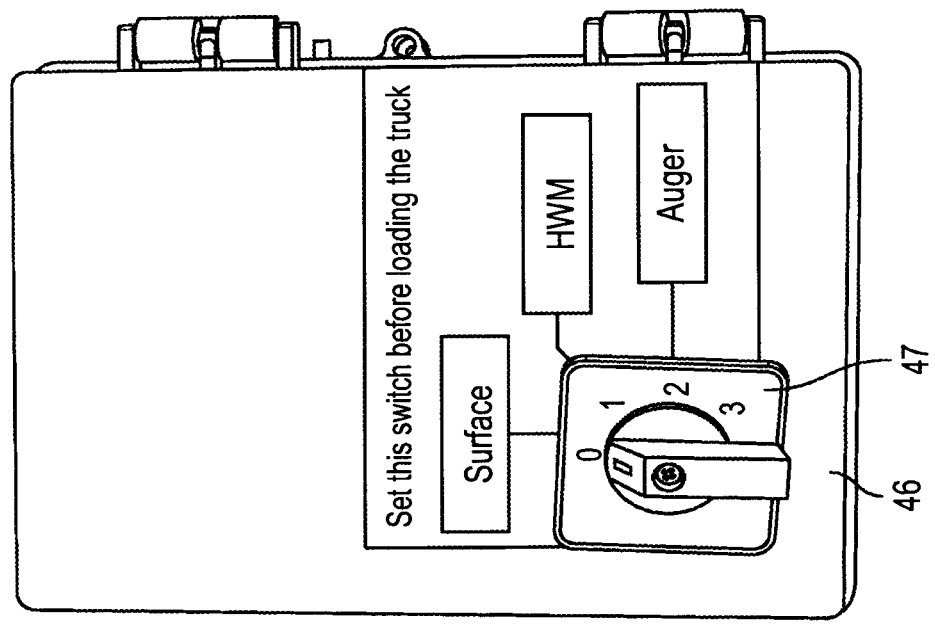
FIG. 8A is a photograph of a control box.

FIG. 8A is a photograph of the control box 46 that can be installed in a loader 10. As shown in FIG. 8B, the inside of the control box 46 contains the RFID read/writer 49, method of extraction switch 47 and power converter 48.

Figure 9:
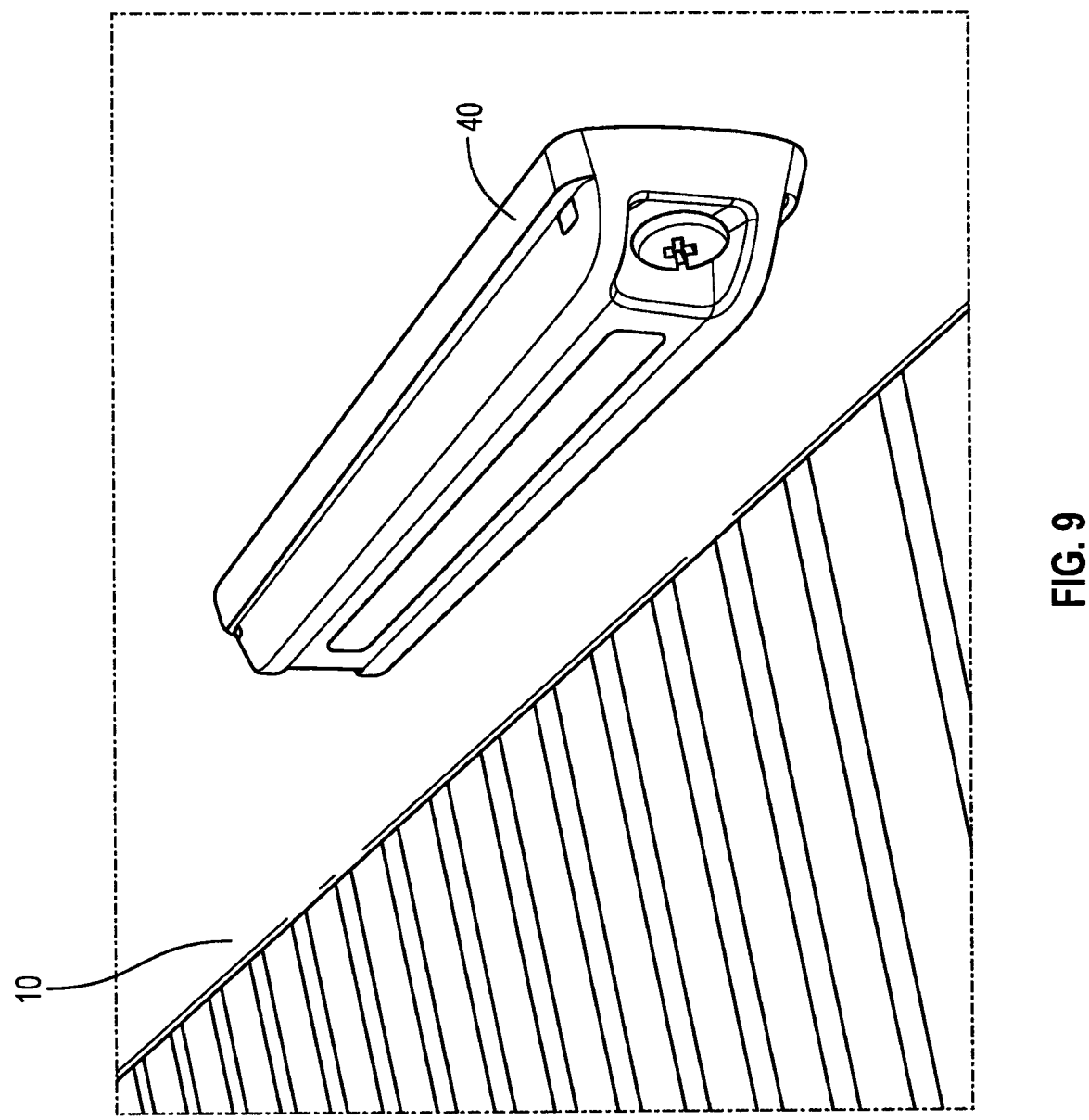
FIG. 9 is a photograph of an exemplary tag.

FIG. 9 shows an exemplary tag 40 used to accept/send data from the coal processing.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A system to process and handle coal during mining operations comprises:

a loader or loading device or machine with a tag writer;

coal loadable trucks with beds having read and writeable electronic tags mounted externally, the beds for receiving coal and the tags being writable from a distance remotely, wherein the tag writer from the coal loader inputs data onto the tags mounted externally on the bed of the truck, the data includes the coal GPS location of the coal being dumped into the bed of the truck, the date or time of the loading of the bed, the method of extraction, loader identification and the truck identification;

at least one truck weighing scale with a tag reader to receive data inputted onto the tags, the weight and the tag data being transmitted to a central data processing center; and wherein the central data processing center further comprises a computer having a database identifying each mine with GPS locations and wherein each mine location is further identified by the mineral rights holder, the fees or royalties applicable per ton based on quality and mine extraction type and wherein upon inputted data from the tags and from the analyzer, the computer has a program to automatically determine mineral rights holder price owed, the value of the coal mined and wherein the computer program automatically produces bills of lading, invoices upon data receipt from said transponders and the analyzer.

2. The system of claim 1 further comprises:

a conveyor system for transferring a load of coal to one of a storage site, a cleaning washing site or a coal loading and transporting site; and an analyzer coupled to a loading end of the conveyor system, the analyzer determines the weight and coal quality in terms of the coal to ash ratio, a contaminant assessment to determine levels of coal elements;

a conveyor diverter wherein conveyed coal stream is continuously moved selectively by coal quality through conveyors divided by the ratio of coal to ash directly onto storage sites for coal of low ash content on through a contaminated coal conveyor to be discarded if coal ash content is high to a wash conveyor to reduce ash content if ash content can be reduced to percentages for electric generators.

3. The system of claim 2 wherein the analyzer has a data transmitter to send a stored computation of the coal load properties to the central data processing center.

4. A system to process and handle minerals, aggregates or ores during mining operations comprises:

a loader with a tag writer;

loadable trucks with beds having read and writeable electronic tags mounted externally, the beds for receiving minerals, aggregates or ores including coal and the tags being writable from a distance remotely, wherein the tag writer from the loader inputs data onto the tags mounted externally on the bed of the truck, the data includes the coal GPS location of the minerals, aggregates or ores including coal being dumped into the bed of the truck, the date or time of the loading of the bed, method of extraction, loader identification and the truck identification;

at least one weighing scale with a tag reader to receive data inputted onto the tags, the weight and the tag data being transmitted to a central data processing center; and wherein the central data processing center further comprises a computer having a database identifying each mine with GPS locations and wherein each mine location is further identified by the mineral rights holder, the fees or royalties applicable per ton based on quality and mine extraction type and wherein upon inputted data from the tags and from the analyzer, the computer has a program to automatically determine mineral rights holder price owed, the value of the coal mined and wherein the computer program automatically produces bills of lading, invoices upon data receipt from said transponders and the analyzer.

* * * * *